April 7, 1959 H. C. RESSLER 2,881,312

SYNCHRONOUS DETECTOR CIRCUIT

Filed May 18, 1955

*INVENTOR.*
HUGH C. RESSLER

*BY* J. B. Burke

*ATTORNEY*

United States Patent Office
2,881,312
Patented Apr. 7, 1959

2,881,312

SYNCHRONOUS DETECTOR CIRCUIT

Hugh C. Ressler, Bayside, N.Y., assignor to Hogan Laboratories, Inc., New York, N.Y., a corporation of New York Application May 18, 1955, Serial No. 509,136

2 Claims. (Cl. 250—27)

This invention relates to an electrical circuit for homodyne or synochronous detection of amplitude modulated or frequency modulated waves.

It is a principal object of the invention to provide a simple, stable and practical synchronous detection circuit for detecting (rectifying) an incoming amplitude or frequency modulated carrier wave.

When the incoming wave is amplitude modulated, i.e., varying in amplitude according to the amplitude of a modulating signal, it may be superimposed on a second interfering wave, such as a band limited noise signal or other spurious signal. When this interfering or spurious signal is as large as or larger in amplitude than the desired signal, a serious loss of signal-to-noise or interference ratio takes place in the conventional simple linear rectifier type of detector. The signal-to-noise ratio after detection can be substantially less than the ratio existing prior to detection. No such loss occurs in the synchronous type of detector. In essence this synchronous detector is a product modulation detector in which the incoming amplitude modulated carrier, and a local carrier of the same frequency and controllable phase are applied to the terminals of the product modulator. If the phase of the local carrier is properly adjusted relative to that of the applied signal wave, the output of the modulator will contain the low frequency modulation signal as one of its components.

To achieve the full benefits of this type of detection the conductance characteristics of the non-linear elements of the modulator-detector should be under the control of the local carrier for a large percentage of the time of one carrier cycle. If this condition obtains the modulator acts much like a simple reversing switch to the signal. During one-half of the carrier cycle the signal wave is transmitted without polarity change to the output terminals of the modulator and during the other half of the time the wave is transmitted with reverse polarity. Since the polarity of the incoming carrier simultaneously reverses during the second interval, the net effect of the circuit is to rectify the signal carrier. If the combined level of the signal and interfering wave at the modulator is less than the level of the local carrier this polarity reversing action or rectification is not affected by the spurious signal and the detected signal-to-noise ratio is the same as that prior to detection.

To eliminate as many of the extraneous frequency components as possible in the output circuit, and thereby to simplify the problem of selecting the detected signal from these components, the modulator should be of the double balanced type in which the fundamental frequency components of the amplitude modulated carrier and the local carrier are not transmitted to the output terminals directly but are balanced out in a Wheatstone bridge type of circuit.

A circuit providing all those characteristics and also having the important property of low conversion loss (logarithm of the ratio of detected output to applied input signal) is described herein. In addition, the detector makes full use of the information contained in a carrier wave existing either as phase or as amplitude modulation. The circuit can thus easily be adapted to detect phase modulated waves as will hereinafter be described. The circuit can also be adapted for detecting frequency modulated waves by convertnig them to phase modulated waves.

In the FM synchronous detector, when two synchronous signals are supplied, the detector functions as a full wave rectifier to one of the applied signals provided it is in phase or phase opposition to the other signal, the polarity depending upon the relative phase. When the relative phase angle is 90 degrees there is no rectification. Spurious signals such as random noise or incoherent interference produce an output signal only through phase or frequency variations. In this detector the several signals are applied to a balanced ring circuit via two branches or inputs. In one signal branch a phase shifting network or filter is used to introduce a phase shift in one signal with respect to the other signal. This phase shift or change in phase angle varies linearly with frequency. The phase shifting introduces little or no amplitude change in the signal over the frequency band of interest. The wave transmitted by the phase shifting network is essentially a sine wave since harmonics of the square wave applied to its input terminals are removed. The sine wave is squared up again by use of a limiter circuit following the phase shifting network. The squared wave is then applied to the balanced demodulator where rectification occurs.

The invention will be best understood by reference to the drawing wherein.

Figures 1, 2, 3:
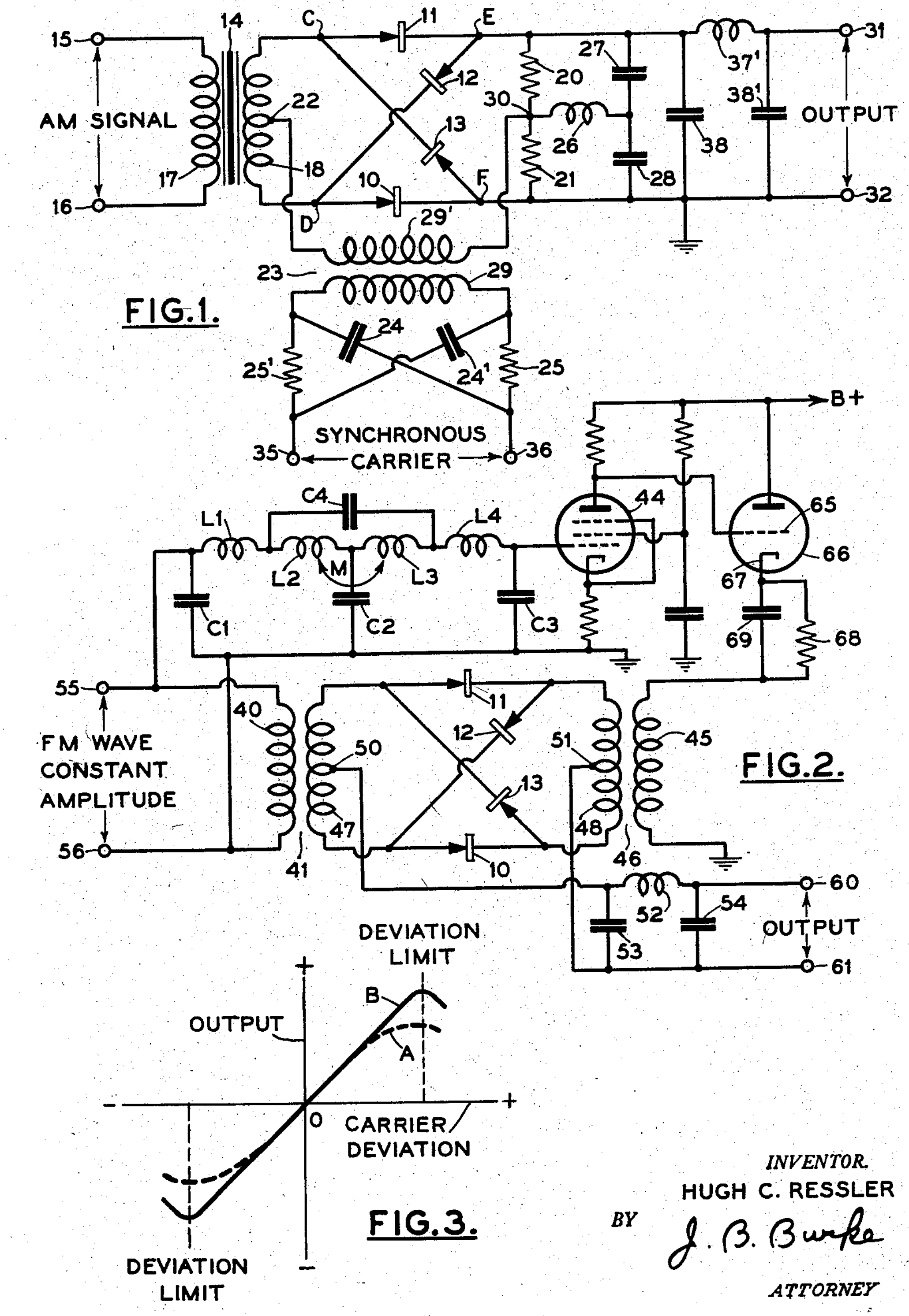
Fig. 1 is a synchronous detector circuit for rectifying amplitude modulated waves.
Fig. 2 is a synchronous detector circuit for detecting frequency modulated waves.

In Fig. 1 four non-linear semi-conductor elements 10, 11, 12, 13 are connected serially in a closed ring between points C—D and E—F as shown. These elements can be any of several known types of semi-conductor rectifiers such as copper oxide, germanium, silicon, selenium, etc. To obtain the best results the four elements should be selected to have substantially the same conductance characteristics, this being one of the conditions for "balance" of the circuit shown. A transformer 14 has its secondary winding 18 connected to the input sides of elements 10, 11, 12 and 13. An amplitude modulated carrier to be rectified is applied to one diagonal C—D of the ring via terminals 15, 16 of the transformer primary winding 17. In many cases of commercial and industrial importance the modulated signal to be detected will contain frequencies extending downward from some upper limit to include very low frequency components, including the so-called D.C. component. The impedance of the output circuit to be connected to the elements of the ring should therefore be in the nature of a pure resistance to exclude the possibility of attenuating these very low frequency currents. In the circuit shown this output circuit is provided by two equal resistors 20, 21 connected across the other diagonal E—F of the ring at the output sides of elements 10, 11, 12, and 13. The local synchronous carrier is applied between the junction 30 of resistors 20, 21 and the center tap 22 on secondary winding 18 via transformer 23 and a phase shifting network. The transformer is used to match the impedance of the source of the local carrier to that of the circuit at points 22, 30. The phase shifting network is a passive network consisting of variable resistors 25, 25' and capacitors 24, 24'. The resistors are connected in series with carrier input terminals 35, 36 and primary winding 29. The capacitors 24, 24' are crossed as shown in the drawing. The resistances 20, 21 may be quite high as compared to that of the individual rectifier elements 10–13, in which case the carrier voltage actually applied to these elements will be only a small fraction of that supplied from transformer 23 due to the series attenuation of resistors 20, 21. To overcome this difficulty, inductance 26 and capacitors 27, 28 provide paths of negligible impedance at carrier frequency between the junction 30 of the resistors 20, 21 and the output terminals E—F of the ring. The inductance 26 and capacitors 27, 28 should be chosen to form series resonant circuits at the oscillator frequency and thus provide low reactance paths for carrier currents. Inductance 26 and capacitors 27, 28 can always be so chosen that the impedances of the capacitors to detected signals current are relatively high as compared with the resistance of resistors 20 and 21. In this way efficient detection and carrier supply circuits are simultaneously provided. The impedance of the secondary winding 29' of transformer 23 can always be made low relative to the resistance of resistors 20 and 21 in which case the transfer of signal currents from the secondary winding 18 to resistors 20, 21 through the rectifier elements 10–13 takes place without significant loss and the efficiency of the detector is high.

In the proper operation of the circuit the amplitude of the local carrier applied to input terminals 35, 36 at the phase shifting network is so adjusted relative to the amplitude of the signal that the peak current through the rectifiers 10–13 due to the local carrier is at least twice the peak current through the rectifiers due to the signal applied at terminals 15, 16 of the primary winding 17. The rectifiers then behave in pairs as either a short or an open circuit to the signal currents, depending only upon the polarity of the local carrier wave.

Referring to Fig. 1, for half of a carrier cycle rectifiers 11 and 10 are in the short circuit condition, the other pair of rectifiers 12, 13 being in the open circuit condition. During the next half cycle the reverse condition obtains. For the detection of an amplitude modulated signal the local carrier should be in phase, or in phase opposition to the signal carrier. This can be accomplished by means of the phase shifting network as shown. The polarity of the D.C. component of the signal with respect to the ground side of the output can be reversed by reversing the phase of the local carrier. For complete separation of the detected signal wave from the extraneous components appearing at the output terminals 31, 32 a low-pass filter consisting of inductor 37 and capacitors 38, 38' of suitable characteristics can be inserted between the detector output and the utilization means to be connected to output terminals 31, 32.

The detector circuit shown in Fig. 1 makes full use of the information contained in a carrier wave existing either as phase or as amplitude modulation. To detect phase modulations, the phase of the local synchronous carrier applied to terminals 22, 30 should be displaced 90 degrees relative to that of the unmodulated signal carrier applied across secondary winding 18. During the peaks of phase modulation of the carrier, its phase relative to that of the local carrier will then be either zero (in phase) or 180 degrees (phase reversal). For these two conditions the output signal will consist of the full wave rectified carrier of equal magnitude and opposite polarity with respect to the ground side of output terminal 32. In the absence of modulation the two carriers are applied to terminals 22, 30 and across secondary winding 18 in 90 degree phase relation, and the low frequency output signal at terminals 31, 32 is zero. At intermediate modulation levels the low frequency output at terminals 31, 32 increases with the phase deviation of the signal carrier.

Analysis shows that if two sine waves are applied to the detector, the amplitude of output signal is not a linear function of the phase angle difference between the two waves. The characteristic curve of the detector has the form shown as A in Fig. 3 wherein the output voltage is plotted as a function of the carrier frequency (or phase) deviation. Further analysis shows that if two rectangular waves are applied to the detector a substantially linear characteristic can be obtained between deviation limits as is shown by curve B in Fig. 3.

The circuit above described can be adapted to detect frequency modulated waves by first converting this modulation into phase modulation and proceeding as before. A circuit for detecting frequency modulated waves is shown in Fig. 2. The term "low frequency" is here used to denote the frequency of the signal wave as distinguished from the carrier wave and its sidebands.

In Fig. 2 a frequency modulated wave of constant amplitude and variable frequency such as would be derived from a limiter amplifier of a frequency modulation signal receiver is applied to input terminals 55, 56. Connected to terminals 55, 56 is primary winding 40 of transformer 41. A passive linear phase shifting network or filter is also connected to terminals 55, 56. This network consists of the four series connected coils $L_1$, $L_2$, $L_3$ and $L_4$ and the shunt capacitors $C_1$, $C_2$, $C_3$. Coils $L_2$, $L_3$ may be a coil tapped at midpoint with the individual halves having an appropriate mutual inductance. Capacitor $C_4$ is connected across coils $L_2$, $L_3$. The linear phase shifting network should have the following characteristics:

(1) The phase shift of the signal on passing through the network increases linearly with the frequency of the wave.

(2) This linear relationship holds over the band of frequencies occupied by the FM wave.

(3) The network transmits all frequencies within this band with uniform (constant) attenuation.

(4) The phase shift of the unmodulated FM carrier in passing through the network is an odd integral multiple of 90 degrees.

(5) At full deviation (plus and minus) of the FM wave the phase shift through the network should differ from that of the unmodulated carrier by plus or minus 90 degrees.

A suitable limiter circuit is connected to the linear phase shifting network to square the wave derived therefrom. The pentode 44 is such a limiter. The output of the limiter is applied to grid 65 of triode 66. This tube feeds the limited phase shifted wave to the ring circuit via primary winding 45 of transformer 46. This winding is in series with cathode 67 of the triode and the R-C elements 68, 69. The original FM wave is applied to one diagonal of ring modulator 10–13, and the limited phase shifted FM wave is applied to the other diagonal via secondary windings 47, 48 of transformers 41, 46. The points of application of the two signals are the conjugate terminals of the balanced circuit. The output of the detector circuit is taken from the center taps 50, 51 of the secondary windings 47, 48. This circuit operates like the phase detector arrangement previously described in connection with Fig. 1.

A low pass filter consisting of inductor 52 and capacitors 53, 54 is shown connected at the circuit output and is used to remove the carrier and harmonic components appearing across the output terminals 50, 51. It has been found that the amplitude of the output signal at terminals 60, 61 can be made a linear function of the frequency deviation of the applied carrier over the entire range providing the waves applied to the ring of elements 10–13 are rectangular in waveform rather than sinusoidal. The limiter circuit 44 follows the linear phase network for so shaping the phase shifted wave. This limiter may be any suitable conventional type of amplitude limiter circuit. The frequency modulated wave applied to terminals 55, 56 is given this rectangular shape by the usual limiter circuit included in the FM receiver proper (not shown). Under such conditions of wave shaping and linear phase shifting the amplitude of the detected signal is linearly proportional to the phase angle between the waves applied to transformers 41 and 46.

The advantages of using semi-conductor elements in above detector circuits are:

(1) Stability and freedom from aging effects.

(2) Sensitivity—the levels required to effect full modulation are many times less than would be required in the case of vacuum tubes.

(3) Simplicity—no filament connections or special balancing circuits required. The characteristic impedance of the circuit is lower and so can be made to work directly into low impedance circuits without the use of amplifier circuits.

What is claimed and sought to be protected by Letters Patent of the United States is:

1. A synchronous detector comprising a plurality of rectifiers connected serially in a closed balanced ring circuit, a transformer having a primary and a center tapped secondary, said secondary being connected across one diagonal of said ring, a source of rectangular-shaped frequency modulated waves connected to said primary; means for applying rectangular-shaped frequency modulated waves to the other diagonal of said ring, said means including in cascade connection: said source of rectangular-shaped frequency modulated waves, a passive phase shifting network adapted to shift the phase of the frequency modulated waves applied thereto linearly over substantially the entire useful range of frequency deviations of the applied waves, an amplitude limiter effective to restore the phase shifted waves to rectangular shape, and a transformer having a primary and a center tapped secondary, the last named secondary being connected across said other diagonal; and an output circuit for receiving the rectified signal waves connected between the center taps of the secondary windings.

2. A synchronous detector circuit according to claim 1 wherein said network comprises three series connected coils, a capacitor connected to across the center one of said coils, and three other capacitors, two of said capacitors being connected in shunt between a common ground point and opposite ends of said coils, and the third one of said three capacitors being connected between the midpoint of said center coil and the common ground point.

References Cited in the file of this patent

UNITED STATES PATENTS

| | | |
|---|---|---|
| 1,959,459 | Cowan | May 2, 1934 |
| 2,263,645 | Rath | Nov. 25, 1941 |
| 2,414,317 | Middel | Jan. 14, 1947 |
| 2,462,093 | Grimes | Feb. 22, 1949 |
| 2,600,226 | Ensink | June 10, 1952 |
| 2,751,495 | Grady | June 19, 1956 |

FOREIGN PATENTS

| | | |
|---|---|---|
| 465,019 | Great Britain | Apr. 29, 1937 |
| 980,824 | France | Jan. 3, 1951 |